United States Patent
Massimo et al.

(10) Patent No.: US 7,409,882 B2
(45) Date of Patent: Aug. 12, 2008

(54) EXOSKELETON INTERFACE APPARATUS

(76) Inventors: Bergamasco Massimo, V. Don Minzoni, 144 56011 Castelmaggiore-Calci (PI) (IT); Fabio Salsedo, Viale Umberto Primo, 10004100 Latina (IT); Andrea Dettori, Via Vecchia della Chiesa, 93h55100 S. Maria a Colle (LU) (IT); Marco Franceschini, Via Sarzanese, 24755100 S.Angelo in campo (LU) (IT); Antonio Frisoli, Via Emilia, 35/A56100 Pisa (IT); Fabrizio Rocchi, Via Roma, 11400024 Castelmadama (Roma) (IT)

( * ) Notice: Subject to any disclaimer, the term of this patent is extended or adjusted under 35 U.S.C. 154(b) by 214 days.

(21) Appl. No.: 10/540,918

(22) PCT Filed: Dec. 31, 2002

(86) PCT No.: PCT/IB02/05664

§ 371 (c)(1),
(2), (4) Date: Jul. 21, 2005

(87) PCT Pub. No.: WO2004/058458

PCT Pub. Date: Jul. 15, 2004

(65) Prior Publication Data
US 2006/0150753 A1     Jul. 13, 2006

(51) Int. Cl.
*A61B 5/103*   (2006.01)
*B25J 9/00*   (2006.01)

(52) U.S. Cl. ............... 73/865.4; 74/480 R; 74/490.07; 74/490.11

(58) Field of Classification Search ........... 73/865.4; 600/595; 414/1–2; 901/1, 9–10, 46; 74/490.07, 74/490.11, 480 R
See application file for complete search history.

(56) References Cited

U.S. PATENT DOCUMENTS 4,883,400 A * 11/1989 Kuban et al. ............... 414/2

(Continued)

OTHER PUBLICATIONS

M. Bergamasco et al., "An Arm Exoskeleton System for Teleoperation and Virtual Environments Applications", May 8-13, 1994, Robotics and Automation, 1994, Proceedings, 1994 IEEE International Confereence, San Diego, CA, IEEE Comput. Soc., 1050-4729/94, pp. 1449-1454, http://ieeexplore.ieee.org/iel2/941/8081/00351286.pdf?tp=&arnumber=351286&isnumb.*

(Continued)

*Primary Examiner*—Thomas P Noland
(74) *Attorney, Agent, or Firm*—Dennison, Schultz & MacDonald

(57) ABSTRACT

An exoskeleton interface apparatus includes five rigid links (2-6) arranged in series, capable of rotating reciprocally at the respective ends for monitoring angular movements of the arm, of the forearm and the wrist of an user (60) and having at the tip an handgrip (30) for engaging with the user (60) by reflecting a force feedback. The rigid links (2-6) can rotate at their ends about rotational joints (11-14) having rotational axes (31-34) incident in the intersection point of the physiological axes of the shoulder. The rotational joints (11-14) are brought into rotation about the respective rotational axes (31-34) by means of respective motors (21-24), for example servo-motor such as torque motors. All the motors (21-24) are mounted on the fixed base link (2) in order to minimize the mass of the parts in movement and the inertia reflected on the user (60). A plurality of idle pulleys (50) is provided, spatially arranged for orienting the tendons (41-44), which brake the free movement of the relative rotational joint, responsive to signals corresponding to constraints on the slave in case of teleoperation or to constraints created by virtual reality systems.

14 Claims, 6 Drawing Sheets

U.S. PATENT DOCUMENTS

| | | | |
|---|---|---|---|
| 5,898,599 A * | 4/1999 | Massie et al. | 345/161 |
| 6,301,526 B1 * | 10/2001 | Kim et al. | 700/260 |
| 6,974,297 B2 * | 12/2005 | Brogårdh | 414/680 |
| 2007/0225620 A1 * | 9/2007 | Carignan et al. | 601/5 |

OTHER PUBLICATIONS

Robert L. Williams II et al., "Kinesthetic Force/Moment Feedback Via Active Exoskeleton", Aug. 2-7, 1998, 1998 Image Conference, Scottsdale, Arizona, 7 pages, http://www.ent.ohiou.edu/~bobw/PDF/Image98.pdf.*

Jacob Rosen et al, "A Myosignal-Based Powered Exoskeleton System", May 2001, IEEE Transaction on Systems, Man, and Cybernetics-Part A: Systems and Humans, vol. 31, No. 3, pp. 210-222, 1083-4427/01, http://ieeexplore.ieee.org/iel5/3468/20026/00925661.pdf?tp=&isnumber=&arnumber=925661.*

* cited by examiner

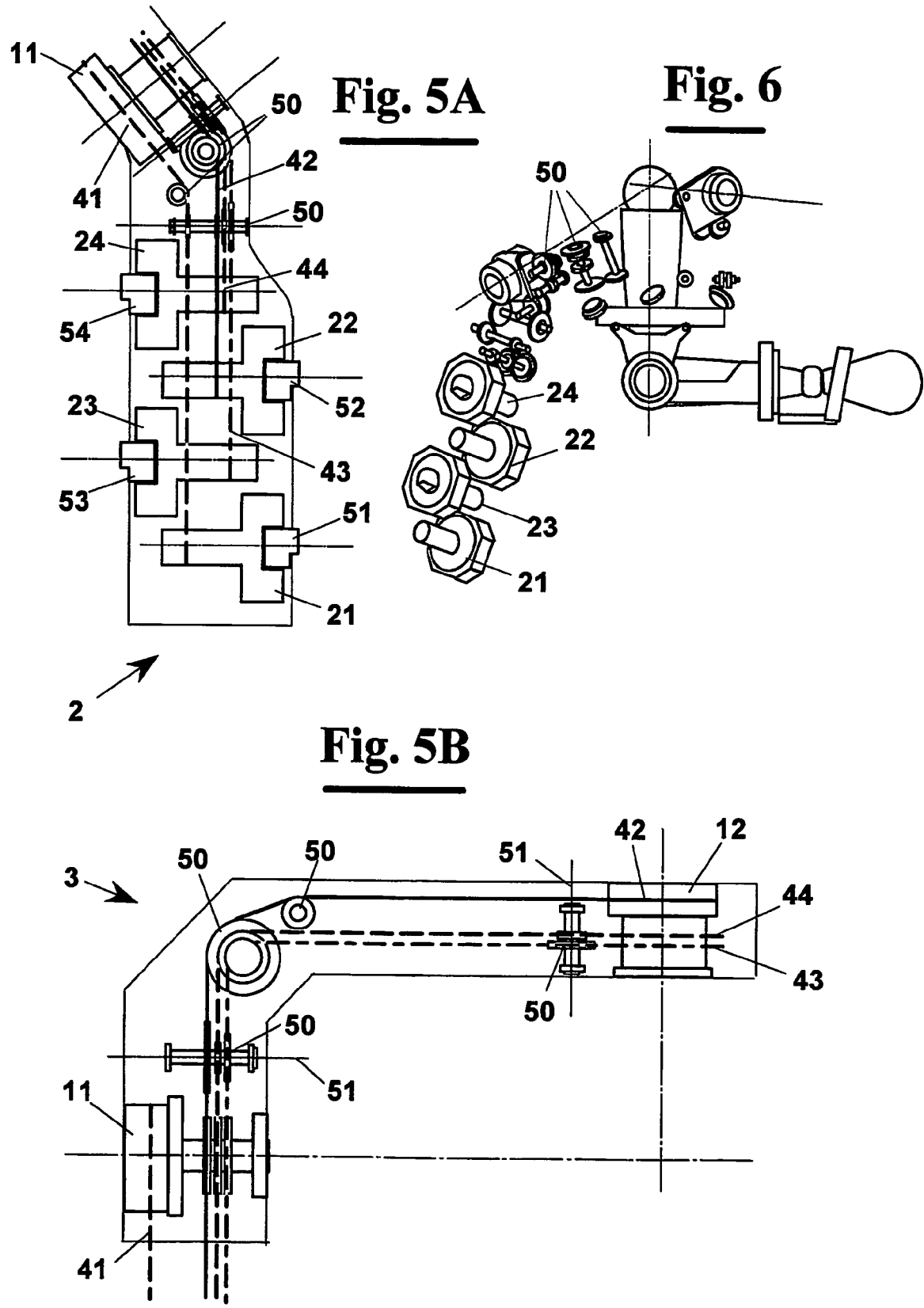

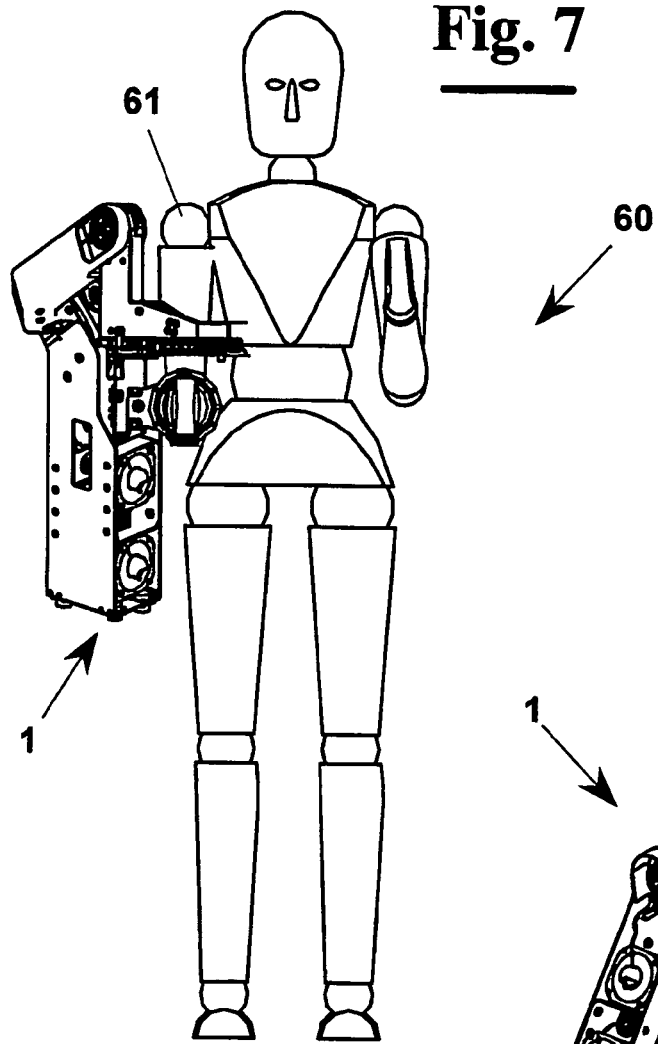
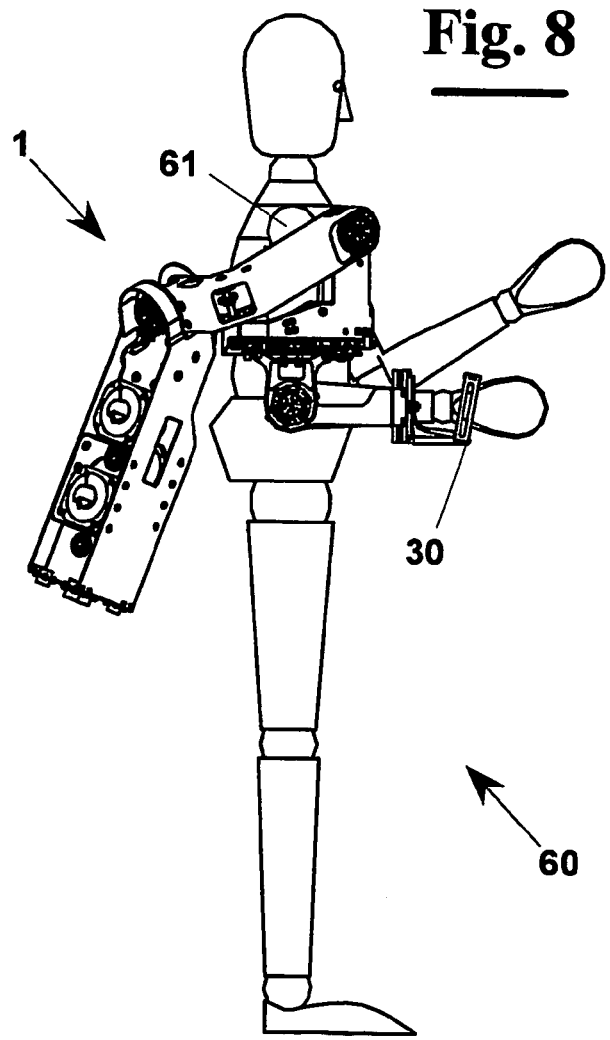

EXOSKELETON INTERFACE APPARATUS

This application is a filing under 35 USC 371 of PCT/IB2002/005664, filed Dec. 31, 2002.

FIELD OF THE INVENTION

The present invention relates to an exoskeleton interface apparatus.

In particular, the invention relates to an exoskeleton haptic interface apparatus capable of engaging directly with a user, detecting the motion of limbs and reflecting sensations of force to predetermined areas of contact.

BACKGROUND OF THE INVENTION

As known, a variety of types of exoskeleton apparatus exist for measuring the position and/or the orientation of an user's limb and that can reflect a force feedback at determined points. As force feedback is meant the replication on the user of "haptic" sensations reflecting handling forces of real or virtual objects.

If the objects are real and the user interacts directly with a physical environment, then Teleoperation is involved, whereas if such objects and the whole environment are created by computers using electronic displays, than Virtual Reality is involved.

Teleoperation provides bilateral communication between a manipulator (robot) operating in a remote environment (slave) and an interface apparatus (master) controlled by the user. This allows to give the robot the capacity of carrying out not foreseeable high skill operations on not structured objects and environments, i.e. whose shape, size and spatial disposition are unknown a priori.

Furthermore, since the master and the slave can communicate even if located at considerable distance (for example by means of satellite broadcasting) operations can be carried out in absolutely safe conditions at places that are dangerous to humans, such as in the maintenance of nuclear sites or of satellites.

Virtual reality can be defined as an interactive and immersive experience in a simulated environment. The fields of application of Virtual reality are many. Among them the following can be cited: simulation, training, medicine, entertainment, teaching, design, etc.

A variety of exoskeleton interface apparatus exist for upper limbs of humans.

For example, a first type of interface apparatus that is used as master in a teleoperation system is "Arm Master" of Sarco Inc. It has 10 freedoms (arm+hand) and is capable of reflecting a force on 3 fingers. The actuating system is hydraulic so that it has the advantage of having a high passband, but it has the drawback of having a big encumbrance and a low "transparency of use" (high friction and high reflected mass on the user).

Then, a type of exoskeleton exists with parallel kinematics developed by the Korea Institute of Science and Technology. The choice of a parallel kinematics has the advantage of a good stiffness, but the mobility of the shoulder and of the elbow are limited. Six linear actuators are provided (three for the arm and three for the forearm) using DC motors and ball recirculations. This solution reduces the reversibility rate and then the transparency of use of the device.

Furthermore, Southern Methodist University obtained a pneumatically actuated interface apparatus with four freedoms called "the Haptic Arm". In this case the sensorisation is obtained by pressure sensors and linear position transducers. The device even if compact and light, is characterised by a low stiffness owing to the pneumatic actuation.

Normally, in the above systems the physiological axes of the arm, forearm and wrist do not coincide with the exoskeleton axes, with subsequent decrease of the actual workspace that is the intersection between the workspace of the human limbs and that of the robotic structure.

Finally, Hashimoto Lab. of Tokio disclosed an exoskeleton with seven freedoms, wherein both the angle and the torque of each joint can be determined by a sensorisation system. The transmission of the movement is carried out by a gearing. This type of transmission allows the physiological axes to coincide with the mechanical axes, but with the drawbacks of high backlash and a low rate of reversibility. In addition, since the motors are arranged on the mobile parts, the inertia reflected on the user is remarkable. Problems of safety are also caused by the fact that, being the structure closed, the introduction and the extraction of the arm it is not simple and immediate.

SUMMARY OF THE INVENTION

It is therefore object of the present invention to provide an exoskeleton interface apparatus to be used as master in teleoperation systems or as interaction device with a virtual environment in virtual reality systems, which allows to detect the posture of a shoulder, of an arm, of a forearm and of a wrist and is capable of reflecting controlled forces in reaction to the movement of the user.

It is another object of the present invention to provide an exoskeleton interface apparatus in which the axes of the joints coincide substantially with the physiological axes of the human limbs in order to increase the actual workspace of the device.

It is a further object of the present invention to provide such a device that has minimum inertia and at the same time is equipped with high stiffness.

It is a particular object of the present invention to provide such a device that an user can put on and off easily.

These and other objects are accomplished by the exoskeleton interface apparatus for detecting the posture of a limb of an user and/or for reflecting controlled forces on the user, according to the present invention, whose characteristic is that it comprises:

at least an element of interaction with a user defining a point of contact with the object to touch and/or to handle;

a plurality of rigid links pivotally connected in series, between said element of interaction and a rigid fixed link, by means of rotational joints whose rotational axes coincide in operative conditions with the physiological axes of at least one limb of the user;

means for generating a motive or braking force arranged in said rigid fixed link;

means for transmitting said force to said rotational joints;

means for measuring the angular position of said rotational joints.

Preferably, said rigid links comprise:

said rigid fixed link, with function of base frame, operatively connected to a second rigid link by a first rotational joint having an axis of rotation;

a third rigid link operatively connected to said second rigid link by means of a second rotational joint having axis of rotation orthogonal to the axis of rotation of the first rotational joint;

a fourth rigid link operatively connected to said third rigid link by means of a third rotational joint with axis of rotation orthogonal to the axis of rotation of the second rotational joint;

a fifth rigid link associated to said element of interaction operatively connected to said fourth rigid link by means of a fourth rotational joint.

In particular, if the exoskeleton interface apparatus is used for monitoring the motion of the shoulder, of the arm and of the wrist of a user the axes of the first, of the second and of the third rotational joint are incident to one another and coincide with the physiological axes of the shoulder, whereas the axis of the fourth rotational joint coincides with the axis of the elbow.

The element of interaction can be connected to the fifth rigid link by means of a fifth rotational joint, for example a ring, for measuring the rotation of the wrist with respect to the elbow.

Advantageously, said applied force is opposite to the free movement of said rigid link corresponding to the movement of a limb of the user.

Preferably, said means for generating a force are motors, for example "torque motors" with a high torque/mass ratio.

Advantageously, each rotational joint is brought independently into rotation about the respective axis, by one of said means for generating a force through said means for transmitting said force.

Advantageously, said means for transmitting the force created by said means for generating comprise at least one tendon. In particular, each means for generating said force is operatively connected to a respective rotational joint by at least one tendon.

Advantageously, since the rotational axes of the rotational joints lay in different planes a plurality is provided of means for deviating each respective tendon through said rigid links.

If said means for transmitting are tendons, said means for orienting can be idle pulleys arranged arbitrarily in the space. This solution is simple to carry out and assures a good stiffness and lightness, without backlash and low friction.

Advantageously, at least one joint of the exoskeleton interface apparatus has open geometry.

Preferably, the third rotational joint has open geometry. This solution allows to put on the interface apparatus easily with lateral movement, instead of introducing the arm into a closed bearing axially form the above, like in the devices of prior art. Furthermore, this solution allows to withdraw quickly the arm from the device in case of danger, increasing the safety of the apparatus.

Advantageously, on the axis of the first, third and fourth rotational joints is mounted an integrated epicyclic reduction gear for reducing the masses of the rigid links at the same conditions of stiffness and applied force.

Advantageously, said means for measuring the angular position of said rotational joints are mounted directly on the axis of said means for generating said force.

Preferably, said means for measuring the angular position of said rotational joints are incremental high resolution encoders.

BRIEF DESCRIPTION OF THE DRAWINGS

Further characteristics and the advantages of the exoskeleton interface apparatus, according to the present invention, will be made clearer with the following description of an embodiment thereof, exemplifying but not limitative, with reference to the attached drawings, wherein:

FIGS. 5A and 5B show diagrammatically the arrangement of the motors and of the transmission parts that bring into rotation the first two rotational joints of the device of FIGS. 1-4;

FIG. 6 shows diagrammatically in a perspective view the spatial arrangement of the transmission parts of FIGS. 5A and 5B.

FIGS. 7 to 10 show a perspective view according to different angles of the exoskeleton interface apparatus of FIG. 1 put on an individual;

DESCRIPTION OF A PREFERRED EMBODIMENT

Figure 1:
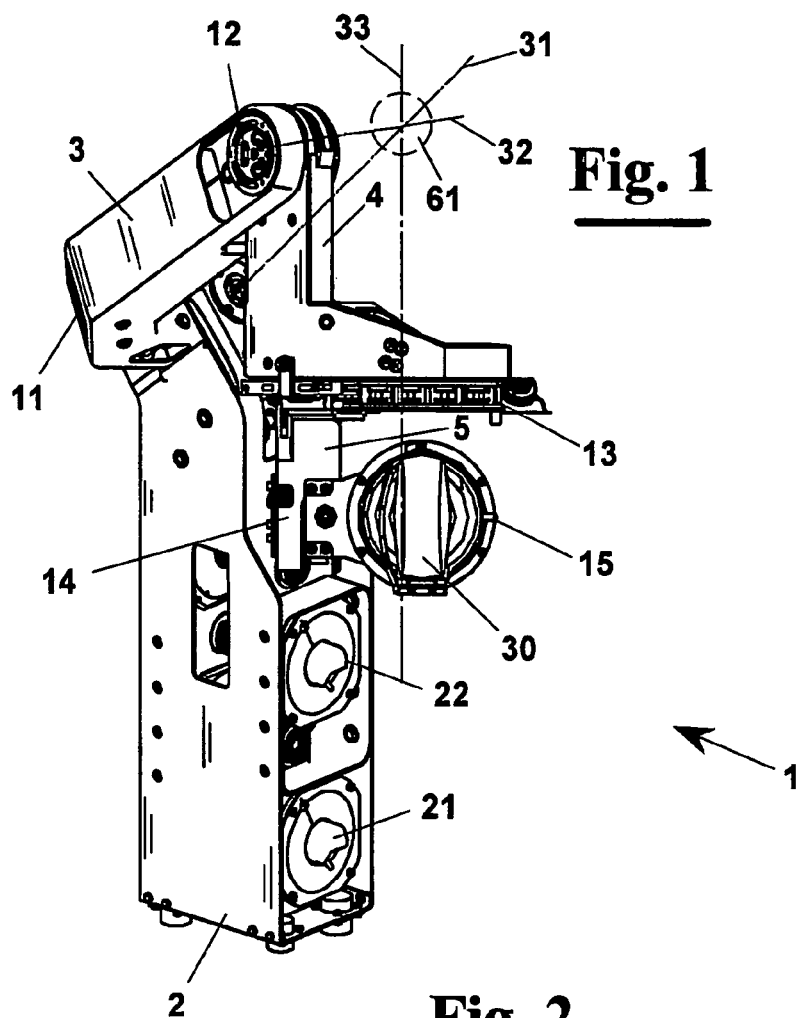
FIGS. 1 to 4 show in different perspective views an exoskeleton interface apparatus according to the invention from different angles for showing the different parts thereof.
Figure 2:
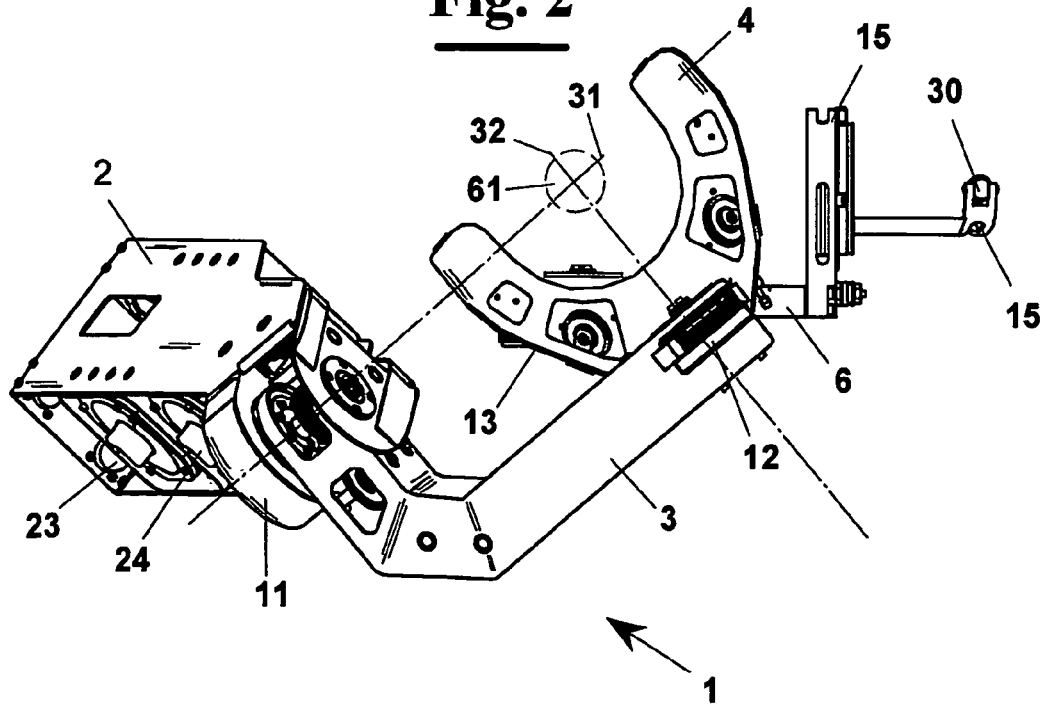
Figure 3:
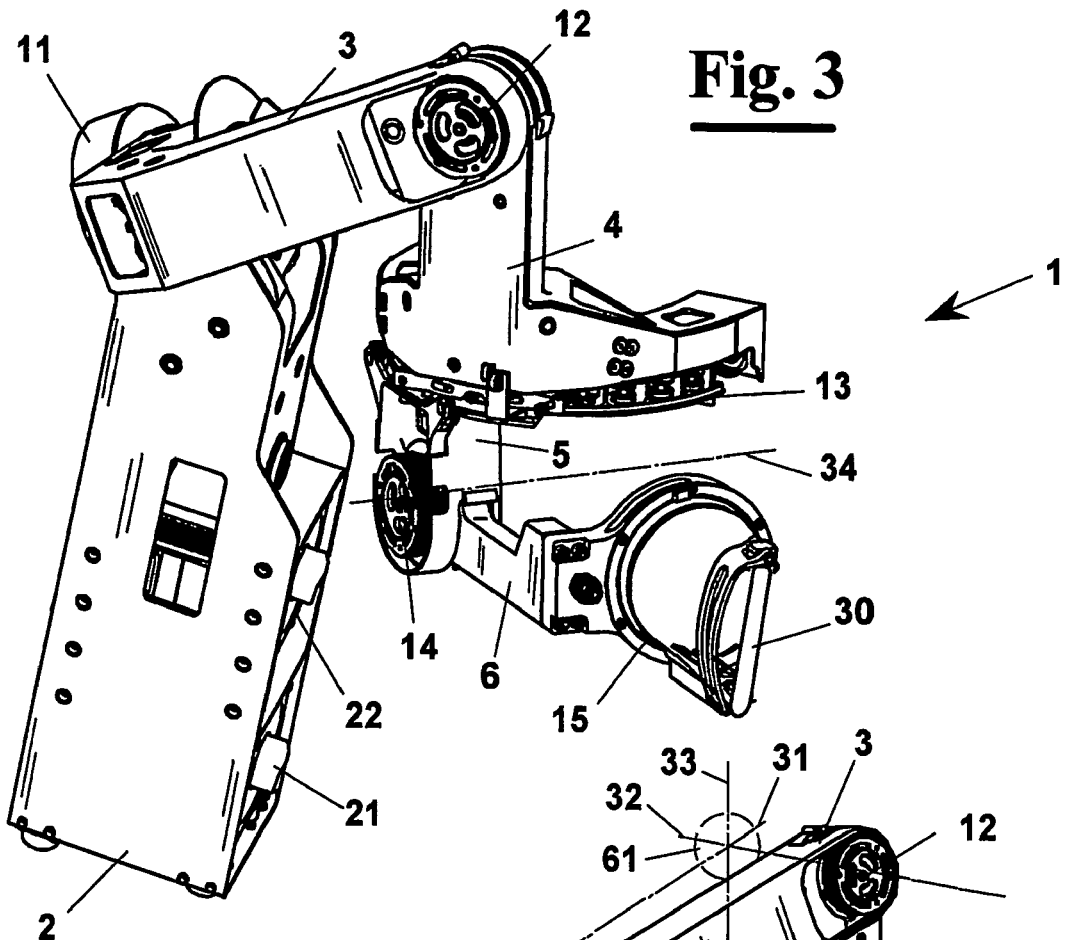
Figure 4:
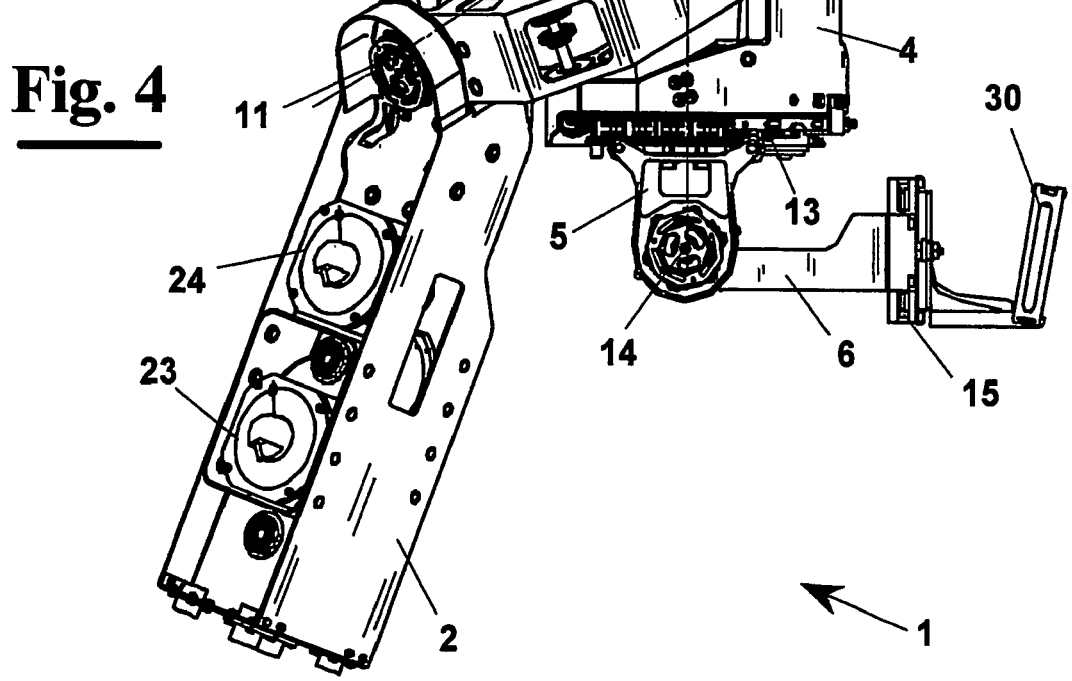
Figure 9:
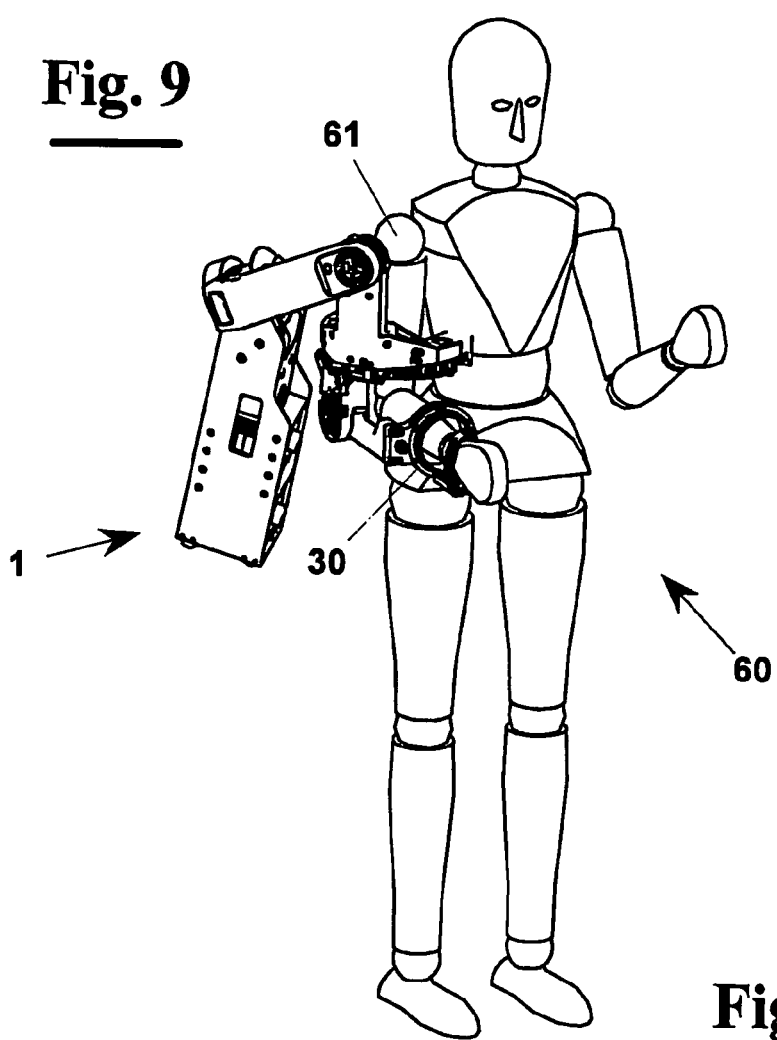
Figure 10:
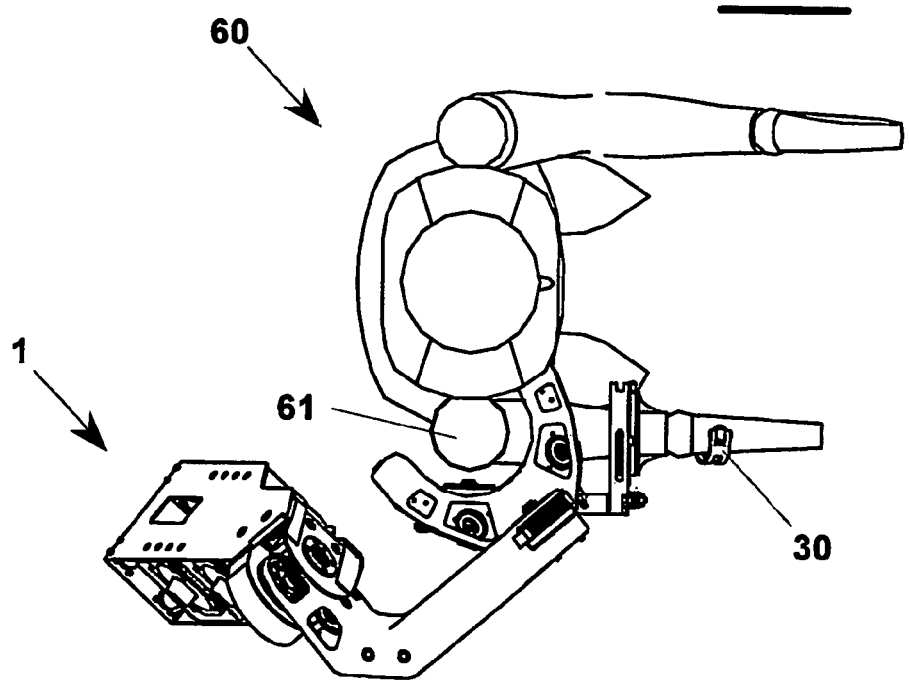

In FIGS. 1 to 4 a possible embodiment is shown of an exoskeleton interface apparatus 1, according to the invention, for measuring the posture of the arm, forearm and wrist of an user and for reflecting controlled forces in predetermined areas of contact thereof.

As shown in said figures, the apparatus 1 comprises five rigid links 2-6 arranged in series capable of rotating reciprocally at the respective ends for monitoring angular movements of the arm, of the forearm and of the wrist of an user 60 and having at the tip an handgrip 30 for the user 60 same (FIG. 7-10) for reflecting a force feedback.

In particular, rigid links 2-6 can rotate at their ends by rotational joints 11-14, which have their rotational axes 31-34 incident in a point that is the intersection of the physiological axes of the shoulder.

More in detail, exoskeleton 1 comprises a rigid fixed link 2, or base frame, suitable for being anchored to a fixed plane, operatively connected to a second rigid link 3 at an end thereof through a first rotational joint 11 having an axis of rotation 31. Second rigid link 3 is then connected to a third rigid link 4 by means of a second rotational joint 12 with an axis of rotation 32 orthogonal to the axis of rotation 31 of first rotational joint 11. The presence of a fourth rigid link 5, which is connected to the third rigid link 4 by means of a third rotational joint 13 with an axis of rotation 33 orthogonal to the axis of rotation 32 of second-rotational joint 12, allows to detect the motion of shoulder 61 of user 60. This is possible since the kinematics of shoulder 61 is approximated to a spherical joint with three degrees of freedom, and a measure of the angular movements of the arm is possible by causing the intersection point of the physiological axes of the shoulder 61 to coincide with the intersection of the axes 31-33 of the exoskeleton and by detecting the angular movement about each axis.

In the embodiment shown in FIGS. 1 to 4 a fifth rigid link 6 is also present associated to the handgrip 30 connected to fourth rigid link 5 by means of a fourth rotational joint 14 with axis of rotation coincident to the axis of rotation of the elbow of the user 60 (FIG. 7-10). In particular, handgrip 30 is connected to fifth rigid link 6 by means of a fifth rotational joint 15, for example a ring bearing, for measuring the rotation of the wrist with respect to the forearm.

Figure 11:
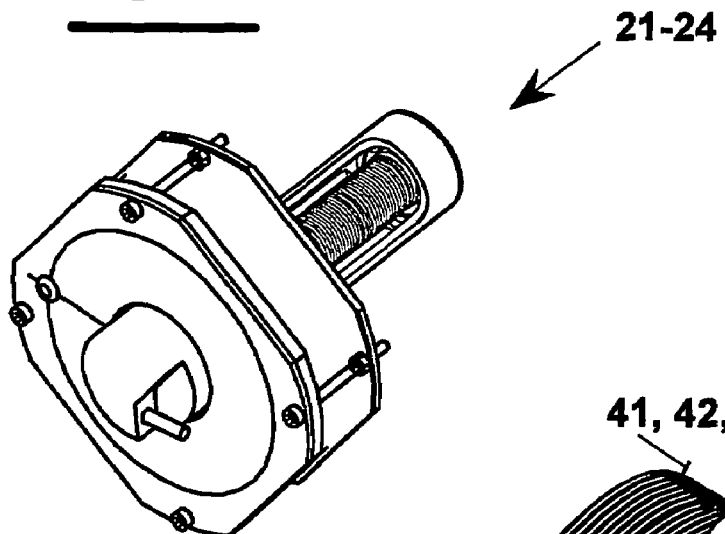
FIG. 11 shows in a perspective view a possible embodiment of a motor for operating the rotational joints of the device of FIG. 1.
Figure 12:
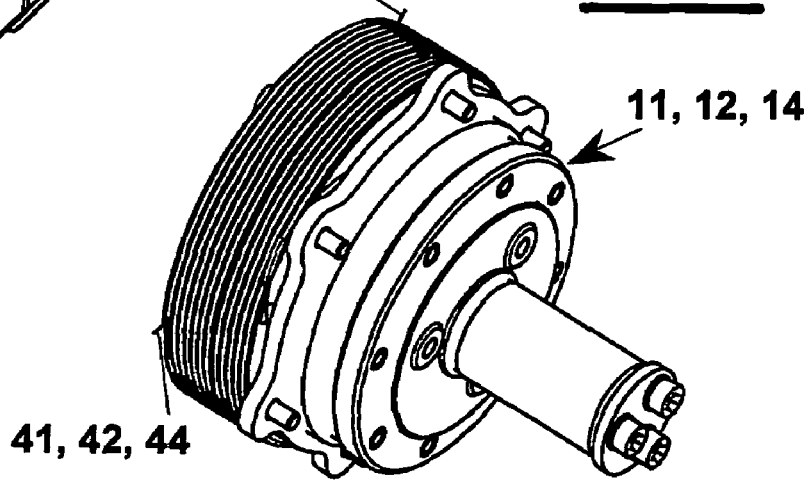
FIG. 12 shows in a perspective view of a possible embodiment of a rotational joint with epicyclic reduction gear integrated used in the device of FIG. 1 for allowing the mutual rotation of two successive rigid links.

With reference to FIGS. 5A and 5B, where a kinematic diagrammatical view is shown of rigid links 2 and 3 respectively, the different rotational joints 11-14 are brought into rotation about the respective rotational axes 31-34 by means of motors 21-24, for example servo-motors such as torque motors (FIG. 11), with a high torque/mass ratio, and in particular, each motor 21-24 brings into rotation a single rotational joint 11-14 about the respective axis of rotation.

According to a preferred aspect of the invention, furthermore, all motors 21-24 are mounted on fixed base link 2, in order to minimize the mass of the parts in movement and the inertia that reflects on user 60.

Since rotational axes 31-34 of rotational joints 11-14 lay in different planes, a plurality of idle pulleys 50 is provided arranged arbitrarily in space (FIG. 6) for orienting tendons 41-44, which are the transmission means of apparatus 1, towards the respective rotational joints.

Each tendon 41-44, in substance, brakes the free movement of the relative rotational joint, according to signals responsive either to constraints on the slave apparatus in case of Teleoperation or to constraints of Virtual Reality. The braking tension is respectively transmitted by motors 21-24 to tendons 41-44 corresponding to the desired force on the joint. The tendons that lead to the most remote joints, in particular joints 13 and 14, go through the other rigid links and simply require more pulleys 50, suitably arranged.

This solution, even if very simple, assures a good stiffness and lightness, with low friction and without any backlash. Furthermore, the particular three-dimensional arrangement of the axes of the pulleys 50 allows to conform the apparatus 1 in a desired way, as close as possible to the human arm, in order to limit as far as possible the size of the apparatus and the interferences of the rigid links with respect to one another, as well as any interferences between the rigid links and body of the user.

For measuring the angular position of joints 11-14, for example, high resolution incremental encoders 51-54 can be used, which are available on the market, mounted directly on the axis of each motor 21-24. This solution allows to provide a "robust" and low cost sensorisation as well as to eliminate the passage of electrical tendons through mobile parts.

Each tendon 41-44 can be connected to each rotational joint 11-14 by either a single tendon branch, for a force feedback in a single direction or for only operating a brake in each respective rotational joint, or two branches parallel to each other, for a differential force feedback in two directions.

Figure 13:
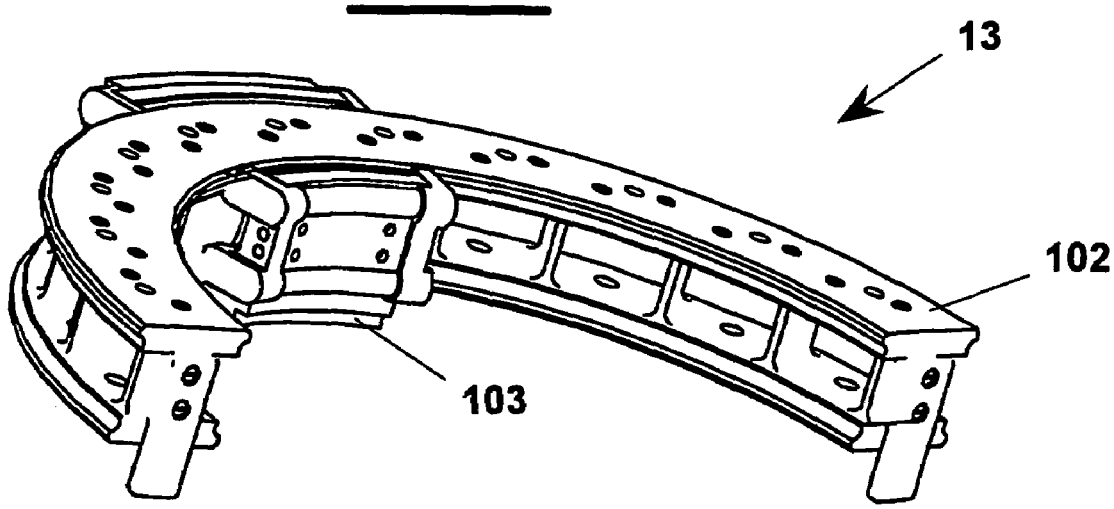
FIG. 13 shows in a perspective view a possible embodiment of an open rotational joint used in the apparatus of FIG. 1.

The detection of the angle of rotation of the shoulder 61 is carried out, according to the invention, by means of one of the three rotational joints, i.e. joint 13, with open geometry and shown in detail in FIG. 13. It provides substantially an open circular guide 102 on which a carriage 103 is slidingly engaged, for example, by a ball recirculation mechanism. On carriage 103 a force is applied by the corresponding motor 23, through tendon 43, which brakes its free movement along open guide 102.

Such open geometry allows the user to put on the apparatus 1 laterally and in a very simple way (see FIG. 9) differently from exoskeletons of prior art, which instead provide the introduction of the arm through a circular closed joint. Furthermore, it assures the safety of the user which, in case of emergency, can withdraw the arm immediately.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. Exoskeleton interface apparatus for detecting the posture of a limb of a user and/or for reflecting controlled forces on the user, comprising:

at least an element of interaction with the user;

a plurality of rigid links pivotally connected in series between said element of interaction and a rigid fixed link, by means of rotational joints having rotational axes which coincide substantially in operative conditions with the physiological axes of at least one limb of the user;

means arranged in said rigid fixed link for generating a motive or braking force;

means for transmitting said force to said rotational joints; and means for measuring the angular position of said rotational joints, wherein at least one said joint of the exoskeleton structure has open geometry.

2. Exoskeleton interface apparatus according to claim 1, wherein said rigid links comprise:

said rigid fixed link, or a base frame, connected to a fixed plane and operatively connected to a second rigid link by a first rotational joint having an axis of rotation;

a third rigid link operatively connected to said second rigid link by means of a second rotational joint having axis of rotation orthogonal to the axis of rotation of the first rotational joint;

a fourth rigid link operatively connected to said third rigid link by means of a third rotational joint with axis of rotation orthogonal to the axis of the second rotational joint; and a fifth rigid link associated to said element of interaction operatively connected to said fourth rigid link by means of a fourth rotational joint.

3. Exoskeleton interface apparatus according to claim 2, wherein, when the exoskeleton interface apparatus is used for monitoring the motion of the shoulder, of the arm and of the wrist of the user, the axes of the first, of the second and of the third rotational joints are incident in a point at the physiological centre of the shoulder, whereas the axis of the fourth rotational joint coincides with the physiological axis of the elbow.

4. Exoskeleton interface apparatus according to claim 2, wherein said element of interaction is connected to the fifth rigid link by means of a fifth rotational joint, for measuring the rotation of the wrist with respect to the forearm.

5. Exoskeleton interface apparatus according to claim 2, wherein said at least one joint of the exoskeleton interface apparatus having open geometry, is said third rotational joint.

6. Exoskeleton interface apparatus according to claim 2, wherein on each rotational axis of the first, third and fourth rotational joint, an integrated epicyclic reduction gear is mounted for reducing the masses of the rigid links at the same conditions of stiffness and applied force.

7. Exoskeleton interface apparatus according to claim 1, wherein the applied force brakes free movement of said rigid link due to movement of a limb of the user.

8. Exoskeleton interface apparatus according to claim 1, wherein the means for generating force are torque motors with a high torque/mass ratio.

9. Exoskeleton interface apparatus according to claim 1, wherein each rotational joint is brought independently into rotation about the respective axis, by one of the means for generating a force through said means for transmitting said force.

10. Exoskeleton interface apparatus according to claim 1, wherein said means for transmitting said force comprises at least one tendon, the means for generating a force comprises a plurality of means therefor, and each means for generating a force is operatively connected to a rotational joint by said at least one tendon.

11. Exoskeleton interface apparatus according to claim 1, wherein the rotational axes of the rotational joints lay in different planes, and a plurality of means is provided for orienting said means for transmitting said force.

12. Exoskeleton interface apparatus according to claim 1, wherein said means for transmitting force are tensioning tendons, tendon orienting means being provided in the form of idle pulleys spatially arranged along said rigid links.

13. Exoskeleton interface apparatus according to claim 1, wherein said means for measuring the angular position of said rotational joints comprise a plurality of means therefor corresponding to each of the plurality of rotational joints with each of the plurality of means therefor mounted directly on an axis of the means for generating said force.

14. Exoskeleton interface apparatus according to claim 13, wherein said means for measuring comprises high resolution incremental encoders.

* * * * *

UNITED STATES PATENT AND TRADEMARK OFFICE
CERTIFICATE OF CORRECTION

PATENT NO. : 7,409,882 B2
APPLICATION NO. : 10/540918
DATED : August 12, 2008
INVENTOR(S) : Bergamasco et al.

It is certified that error appears in the above-identified patent and that said Letters Patent is hereby corrected as shown below:

On title page Item

(76) Inventors: change "Bergamasco Massimo" to --Massimo Bergamasco--.

On title page Item

(12) change Massimo to Bergamasco et al.

Signed and Sealed this

Thirtieth Day of September, 2008

JON W. DUDAS
*Director of the United States Patent and Trademark Office*